United States Patent [19]

Speer

[11] 4,047,446
[45] Sept. 13, 1977

[54] ENDLESS POWER TRANSMISSION BELT
[75] Inventor: Billy L. Speer, Springfield, Mo.
[73] Assignee: Dayco Corporation, Dayton, Ohio
[21] Appl. No.: 696,108
[22] Filed: June 14, 1976
[51] Int. Cl.² .......................... F16G 5/00; F16G 1/00
[52] U.S. Cl. ..................................................... 74/234
[58] Field of Search .................... 74/234, 237, 231 R, 74/231 P

[56] References Cited
U.S. PATENT DOCUMENTS

| | | | |
|---|---|---|---|
| 3,839,116 | 10/1974 | Thomas et al. | 74/234 |
| 3,948,113 | 4/1976 | Stork | 74/234 |
| 3,996,813 | 12/1976 | Henderson et al. | 74/234 |

Primary Examiner—Leonard H. Gerin
Attorney, Agent, or Firm—Reuben Wolk

[57] ABSTRACT

An endless power transmission belt is provided which has a compression section and a plurality of longitudinally extending ribs comprising the compression section and defining the inside surface of the belt and each pair of immediately adjacent ribs has a space therebetween with the space allowing wear of the ribs while assuring the apexes of sheave projections operatively associating with the belt are maintained spaced from the belt thereby prolonging the life thereof.

16 Claims, 4 Drawing Figures

ENDLESS POWER TRANSMISSION BELT

BACKGROUND OF THE INVENTION

Endless power transmission belts each having a plurality of longitudinally extending ribs, and often referred to as ribbed belts, are in wide use throughout industry. One of the problems associated with each of such ribbed belts is that the belt wears unevenly and fails prematurely because of poor operative engagement of the belt with associated sheaves of a drive system. In general, this has been due to two factors one being that the sheaves used with each of such ribbed belts have projections in which the apexes thereof extend between the belt ribs and engage the main belt body, due to lack of relief space between belt ribs, providing high load concentrations at their points of engagement which result in excessive heat buildup, premature wear, and failure of the entire belt. The second factor has been that the ribs of such ribbed belts extend too far into the grooves of their associated sheaves often bottoming out, long before a satisfactory belt life has been achieved, and again causing excessive heat buildup, premature wear, and belt failure.

SUMMARY

It is a feature of this invention to provide an endless so-called ribbed belt which has integral longitudinally extending ribs comprising its compression section and wherein the construction and arrangement of such belt and ribs is such that it is capable of operating for extended periods of time in associated sheaves with minimum likelihood of failure.

Another feature of this invention is the provision of an endless belt of the character mentioned having a plurality of longitudinally extending ribs comprising its compression section and defining the inside surface of the belt wherein each pair of immediately adjacent ribs has a space therebetween and the spaces allow normal wear of the ribs while assuring apexes of projections on sheaves operatively associated with the belt are maintained spaced from the belt thereby prolonging the life of such belt.

Another feature of this invention is the provision of an endless ribbed belt of the character mentioned having ribs which will wear normally for a substantial service life without bottoming out.

Another feature of this invention is the provision of a ribbed belt of the character mentioned having raw-edged ribs and a space between each pair of immediately adjacent ribs defined by raw-edged surface portions of the belt.

Another feature of this invention is the provision of a ribbed belt of the character mentioned having covered ribs and a space between each pair of immediately adjacent ribs defined by covered surface portions of the belt.

Another feature of this invention is the provision of a ribbed belt of the character mentioned wherein each of its ribs has a roughly V-shaped cross-sectional outline.

Another feature of this invention is the provision of a belt drive system employing a ribbed belt of the character mentioned and associated sheaves adapted to received such belt.

Accordingly, it is an object of this invention to provide an endless power transmission belt and a belt drive system using same having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
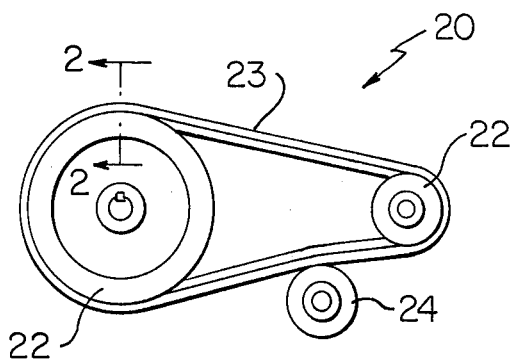
FIG. 1 is a schematic view particularly illustrating one exemplary embodiment of the belt of this invention being utilized in a drive system comprised of a driving sheave, a driven sheave, and a tensioning roller.

Reference is now made to FIG. 1 of the drawing which illustrates an exemplary belt drive system of this invention which is designated generally by the reference numeral 20 and the belt drive system 20 comprises a driving sheave (shown as a small diameter sheave) and a driven sheave (shown as the larger diameter sheave) and for ease of description each of these sheaves is designated by the same reference numeral 22. The sheaves 22 have one exemplary embodiment of the belt of this invention which is designated generally by the reference numeral 23 operatively connected therebetween and a tensioning roller 24 is provided for providing a controlled tension in the belt 23. Each of the sheaves 22 is in the form of a grooved sheave which is particularly adapted to receive the belt 23 of this invention within integral grooves thereof and in a manner to be described in detail subsequently.

Figure 2:
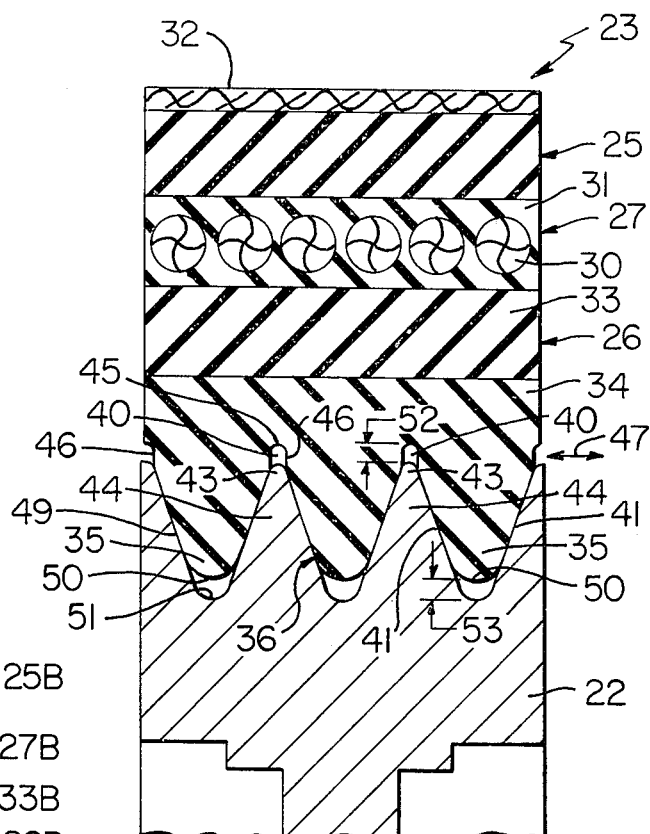
FIG. 2 is an enlarged fragmentary cross-sectional view taken essentially on the line 2—2 of FIG. 1.

As best seen in FIG. 2 of the drawing, the belt 23 comprises a tension section 25, a compression section 26 and a load-carrying section 27. The load-carrying section 27 of this example has load-carrying means in the form of a helically wound load-carrying cord 30 which is suitably embedded in an elastomeric matrix or cushion 31 as is well known in the art. The load-carrying cord 30 may be made of any suitable material used in the art for this purpose.

The tension section 25 is comprised of a suitable elastomeric material, shown by cross-hatching in the drawing as a rubber layer, which adjoins the load-carrying section 27; and, an outside fabric layer or cover 32 is provided and defines the outer layer of the tension section and the outside surface of the belt.

The compression section 26 of the belt 23 has an inner layer portion 33 adjoining the load-carrying section 27 and an outer portion 34 defined by a plurality of longitudinally extending ribs each designated by the same reference numeral 35 whereby the belt is popularly referred to as a ribbed belt 23. The longitudinally extending ribs 35 define the inside surface of the belt which is designated generally by the reference numeral 36.

Each pair of immediately adjacent ribs 35 of the belt 23 has a space 40 therebetween and the spaces 40 allow wear of opposite arranged wedging surfaces or inclined surfaces 41 of the ribs in the sheaves 22 while assuring that apexes 43 of projections 44 of each sheave 22 which operatively associate with the belt 23 are maintained spaced from the main body of the belt with normal wear of the ribs 35; and, in particular with normal wear along the surfaces 41 of such ribs thereby prolonging the life of the belt 23.

Each space 40 when viewed in cross-section has a substantially U-shaped peripheral outline which is defined by a substantially semi-circular bight 45 adjoined at opposite ends thereof by a pair of straight parallel legs 46 which extend from opposite ends of such bight. The semicircular surface portions of the belt defining the bights 45 enable nesting movements of the ribs 35. In particular, each rib 35 adjoining a space 40 may move transverse the longitudinal axis of the rib as shown by the double arrow 47 substantially free of stresses. It will be appreciated that the spaces 40 as defined with the smooth rounded bight 45 and outwardly extending legs 46 prevent stress concentrations at the bases of the ribs 35 where they are integrally formed with the remainder of their compression section.

Each rib 35 has a roughly V-shaped outer portion terminating in a rounded apex 50; and, in the exemplary belt 23 each rib is, in essence, a raw-edged rib inasmuch as it is free of covers and each space 40 between each pair of immediately adjacent ribs is also defined by raw-edged surface portions of the belt whereby the surface portions of the belt whereby the surface portions of the belt defining the bight 45 and the outwardly extending legs 46 are raw-edged portions or uncovered. Accordingly, the entire inside surface of the ribbed belt 23 is a raw-edge inside surface.

The belt 23 is constructed such that the apexes 43 comprising the projections 44 of the sheaves 22 will not bottom against the main body of the belt and basically against the main body as defined by the surface portions of the belt which define the bight 45 of each space 40. In addition, each apex 50 of each projection 35 is rounded or shortened in extension or height so that with wear of the ribs 35 the apexes 50 thereof will not bottom in the surfaces 51 defining the grooves 49 in each sheave 22.

In the exemplary belt 23 the clearance between each apex 43 of each projection 44 of each sheave 22 and the bottom of an associated space 40 as defined by a bight 45 is provided as a controlled distance or dimension 52 and this distance is preferably substantially equal to the distance 53 between the bottom of each apex 50 of each rib 35 and the bottom surface 51 of each associated groove 49. Accordingly, as the belt 23 wears, the inner surface of each space 40 as defined by bight 45 and the outside surface of each apex 50 are engaged by associated portions of each associated sheave 22 in a substantially simultaneous manner thereby avoiding high unit loading which would otherwise take place with its resultant excessive heat buildup and possible premature belt failure. However, it is to be understood that it is preferred that in the belt 23, the spaces 40 and apexes 50 are constructed and arranged so that in actual practice the apexes 43 of the projections 44 of associated sheaves 22 do not bottom against the belt body and the apexes 50 of ribs 35 do not bottom against the surfaces 51 of the grooves 52 whereby normal belt wear over the normal surface life of the belt 23 occurs on the opposed surfaces 41 of each rib while providing the desired wedging engagement as is well known in the art.

Figure 4:
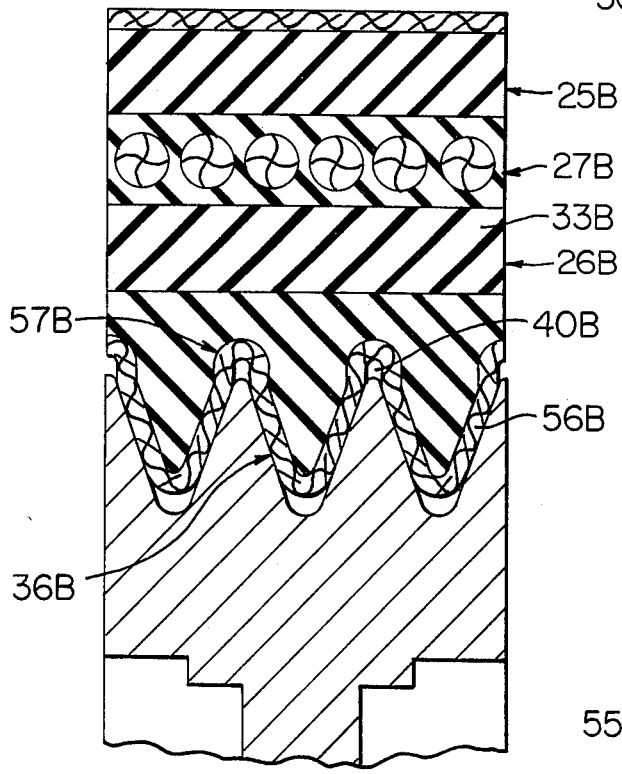
FIG. 4 is a view similar to FIG. 2 illustrating another embodiment of the belt of this invention being utilized in the drive system of FIG. 1.
Figure 3:
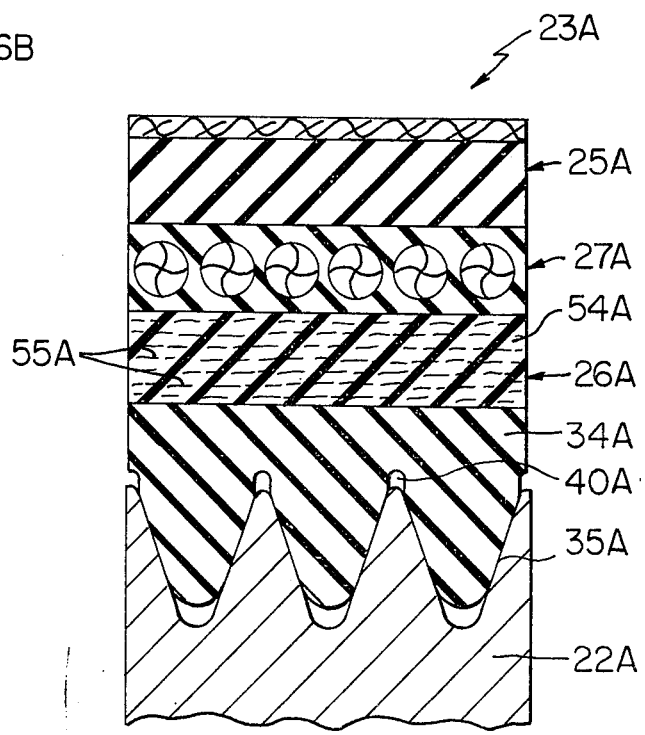
FIG. 3 is a view similar to the upper portion of FIG. 2 illustrating another embodiment of the belt of this invention being utilized in the drive system of FIG. 1.

Other exemplary embodiments of the belt of this invention are illustrated in FIGS. 3 and 4. The belts illustrated in FIGS. 3 and 4 are very similar to the belt 23; therefore, such belts will be designated by the general reference numerals 23A and 23B, respectively and representative parts of each belt which are similar to corresponding parts of the belt 23 will be designated in the drawing by the same reference numeral as in the belt 23 whether or not such parts are mentioned in the specification) followed by the associated letter designation A or B and not described again in detail. Only those component parts of each belt which are different from corresponding parts of the belt 23 will be designated by a new reference numeral and also followed by the associated letter designation and described in detail.

The belt 23A of FIG. 3 has a tension section 25A, compression section 26A, and a load-carrying section 27A and the main difference between the belt 23A and belt 23 is in its compression section. In particular, the compression section 26A has an outer ribbed portion 34A similar to portion 34 of belt 23 with a space 40A between each pair of immediately adjacent ribs 35A; however, it will be seen that the compression section has an inner layer portion 54A which instead of being made of a plain elastomeric material such as rubber is in the form of a fiber-loaded layer. In particular, the layer portion 54A has a plurality of randomly arranged fingers embedded therein with a representative few of such fibers being designated by the same reference numeral 55A. The fibers 55A are disposed in roughly parallel relation transverse the longitudinal axis of the belt and allow longitudinally flexibility for the belt 23A as it moves in its endless path around the sheaves yet provide transverse stiffness or rigidity. The fibers 55A may be made of any suitable material known in the art and may have diameters ranging between 0.001 inch and 0.005 inch and lengths ranging between 0.001 and several inches.

The belt 23B of FIG. 4 has a tension section 25B, a compression section 26B, and a load-carrying section 27B; however, it will be seen that instead of having raw-edged ribs defining the inside surface 36B of the belt 23B each of the ribs has a cover 56B thereon and each space 40B between each pair of immediately adjacent ribs is defined by surface portions having the cover 56B thereon and as shown at 57B for example. The inner layer portion 33B of the belt 23B is similar to the inner layer portion 33 of the belt 23; however, it will be appreciated that such inner layer portion may be in the form of a fiber-loaded layer portion such as the layer 54A of the belt 23A.

The inside cover 56B of the belt 23B and the outside covers of the belts 23, 23A, and 23B may be made of any suitable material known in the art and such covers may be in the form of woven covers, non-woven covers, knitted covers, and the like. Further, such covers may be made of square-woven fabric, stress-relieved fabric, or any suitable fabric material. In addition, each of the woven fabric covers may have the warps and wefts thereof bias laid at an angle to the axis of its belt.

The elastomeric material comprising various component portions of each belt disclosed herein is shown in the drawing as being rubber. However, it is to be understood that any section of any of the illustrated belts or a plurality of sections of such belts may be made of any suitable elastomeric material including any synthetic plastic material, for example.

While present exemplary embodiments of this invention, and methods of practicing the same, have been illustrated and described, it will be recognized that this invention may be otherwise variously embodied and

What is claimed is:

1. An endless power transmission belt having a compression section and a plurality of longitudinally extending ribs comprising said compression section and defining the inside surface of said belt, each pair of immediately adjacent ribs having a space therebetween which when viewed in cross section has a substantially U-shaped peripheral outline, said spaces allowing wear of said ribs while assuring apexes of sheave projections operatively engaging said belt are maintained spaced from said belt with normal wear of said ribs thereby prolonging belt life.

2. a belt as set forth in claim 2 in which said U-shaped peripheral outline of each of said spaces is defined by a substantially semicircular bight adjoined by a pair of parallel legs extending from opposite ends of said bight, said semicircular bight enabling nesting movement of each rib associated therewith transverse the longitidinal axis of each rib substantially free of stresses.

3. A belt as set forth in claim 2 in which each of said ribs has a roughly V-shaped outer portion.

4. A belt as set forth in claim 3 in which the rougly V-shaped outer portion of each rib has a rounded apex.

5. A belt as set forth in claim 4 in which each of said ribs is a raw-edged rib and each space between each pair of immediately adjacent ribs is defined by raw-edged surface portions.

6. A belt as set forth in claim 4 in which each of said ribs has a cover thereon and each space between each pair of immediately adjacent ribs is defined by surface portions having said cover thereon.

7. A belt as set forth in claim 6 in which said cover is a fabric cover.

8. A belt as set forth in claim 2 in which said compression section has an integral layer provided with a plurality of stiffening fibers embedded therein.

9. An endless power transmission belt compising, a tension section, load-carrying section, and a compression section with a plurality of longitudinally extending ribs defining its outer portion and defining the inside surface of said belt, each pair of immediately adjacent ribs having a space therebetween which when viewed in cross section has a substantially U-shaped peripheral outline, said spaces allowing wear of said ribs while assuring apexes of sheave projections operatively engaging said belt are maintained spaced from said belt with normal wear of said ribs thereby prolonging belt life.

10. A belt as set forth in claim 9 in which said u-shaped peripheral outline of each of said spaces is defined by a substantially semicircular bight adjoined by a pair of parallel legs extending from opposite ends of said bight, said semicircular bight enabling nesting movement of each rib associated therewith transverse the longitudinal axis of each rib substantially free of stresses.

11. A belt as set forth in claim 10 in which said load-carrying section is comprised of a helically wound load-carrying cord embedded in an elastomeric matrix.

12. A belt as set forth in claim 10 in which said compression section is comprised of a plurality of layer portions including an inner layer portion adjoining said load-carrying section and an outer layer portion having said ribs defined therein.

13. A belt as set forth in claim 12 in which said inner layer portion has a plurality of fibers embedded therein to increase the transverse stiffness thereof.

14. A belt as set forth in claim 13 in which each of said ribs has a roughly V-shaped outer portion.

15. A belt as set forth in claim 10 in which each of said ribs is a raw-edged rib and each space between each pair of immediately adjacent ribs is defined by raw-edged surface portions.

16. A belt as set forth in claim 10 in which each of said ribs has a cover thereon and each space between each pair of immediately adjacent ribs is defined by surface portions having said cover thereon.

* * * * *

UNITED STATES PATENT OFFICE
CERTIFICATE OF CORRECTION

PATENT NO. : 4,047,446
DATED : September 13, 1977
INVENTOR(S) : Billy L. Speer

It is certified that error appears in the above-identified patent and that said Letters Patent are hereby corrected as shown below:

Col. 4, lines 23 and 24, "fingers" should be --fibers--.

Col. 5, line 14, "a" should be --A-- and

"2" should be --1--.

Signed and Sealed this

Thirteenth Day of December 1977

[SEAL]

Attest:

RUTH C. MASON
Attesting Officer

LUTRELLE F. PARKER
Acting Commissioner of Patents and Trademarks